June 2, 1931.  E. A. LERNER  1,808,236
SPROCKET CHAIN
Filed June 16, 1928  3 Sheets-Sheet 1
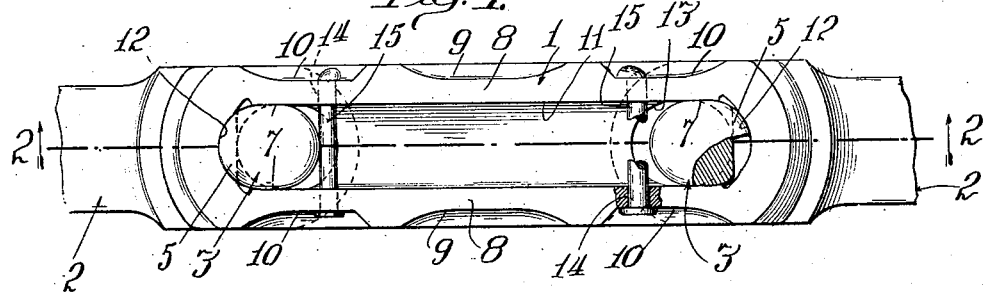
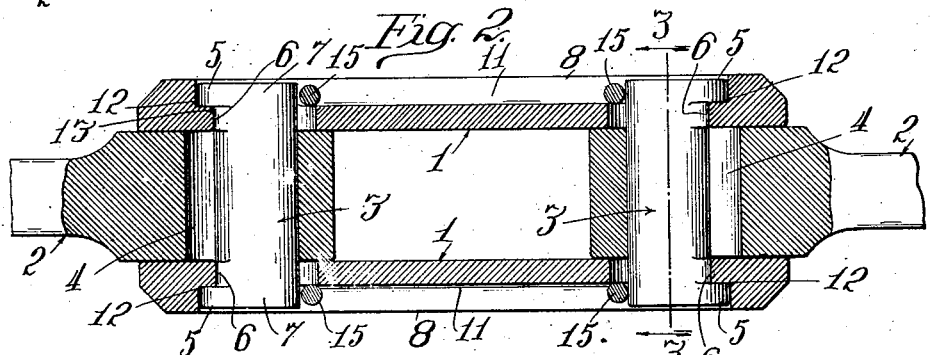
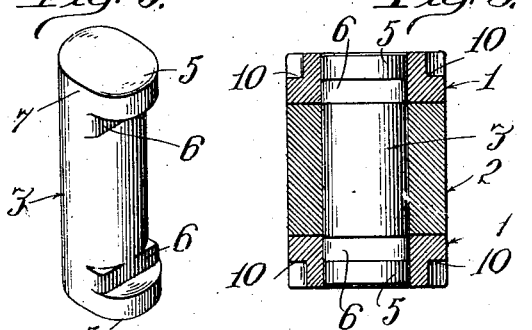
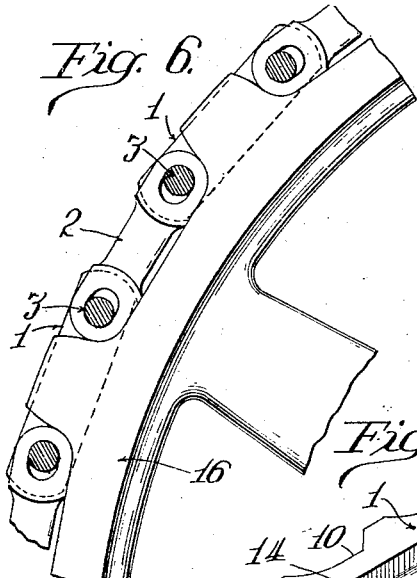
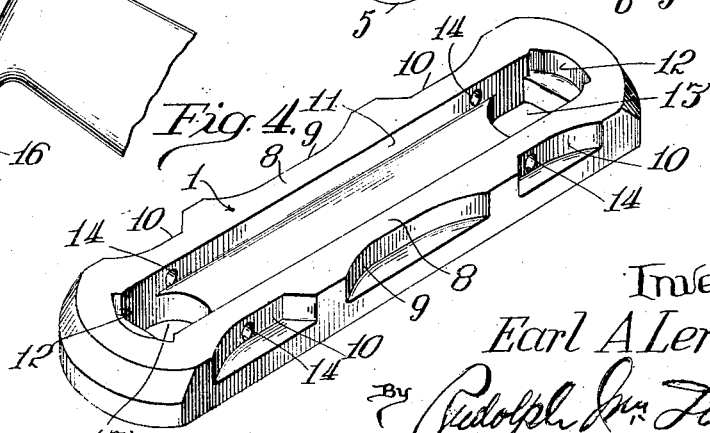
Inventor
Earl A Lerner
By Rudolph Jno. Loe
Attorney

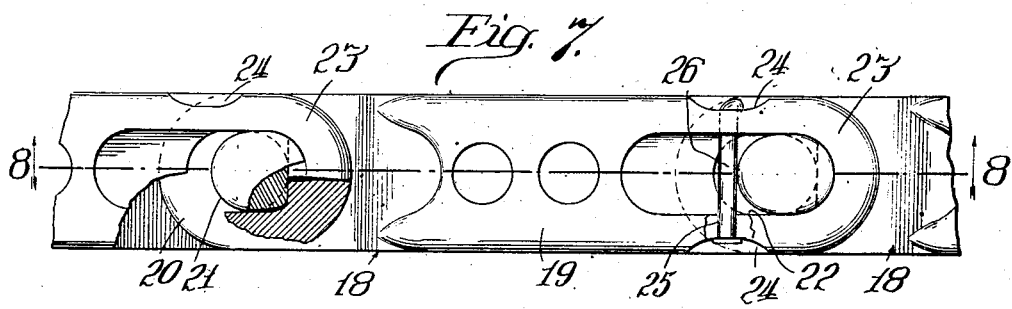
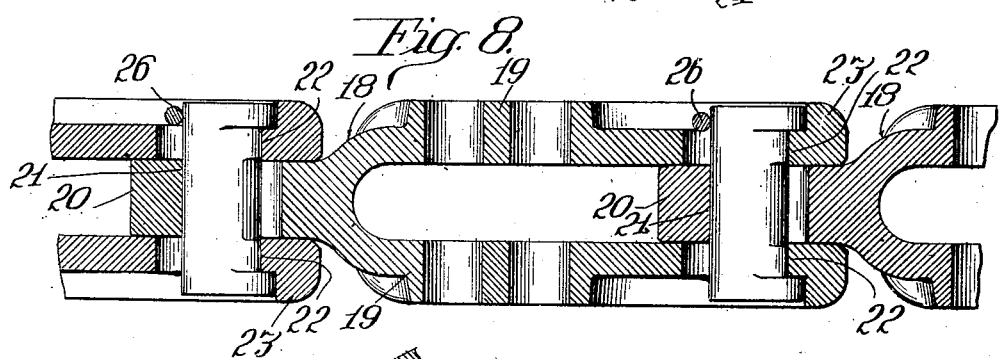
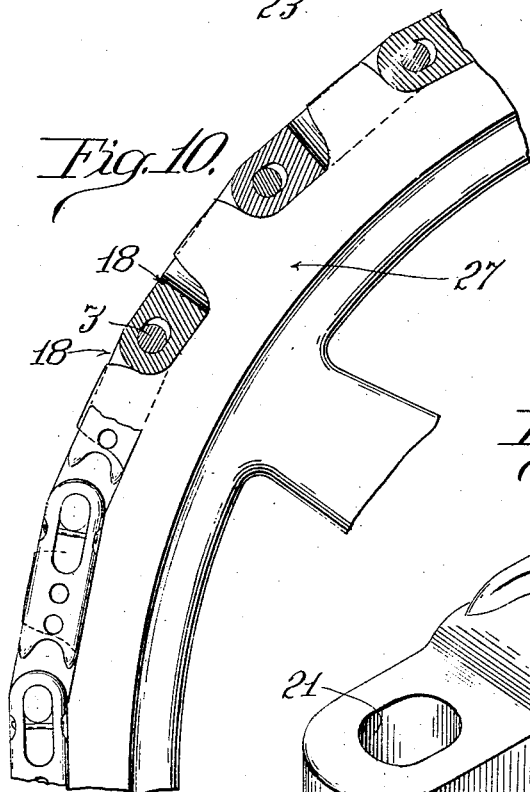
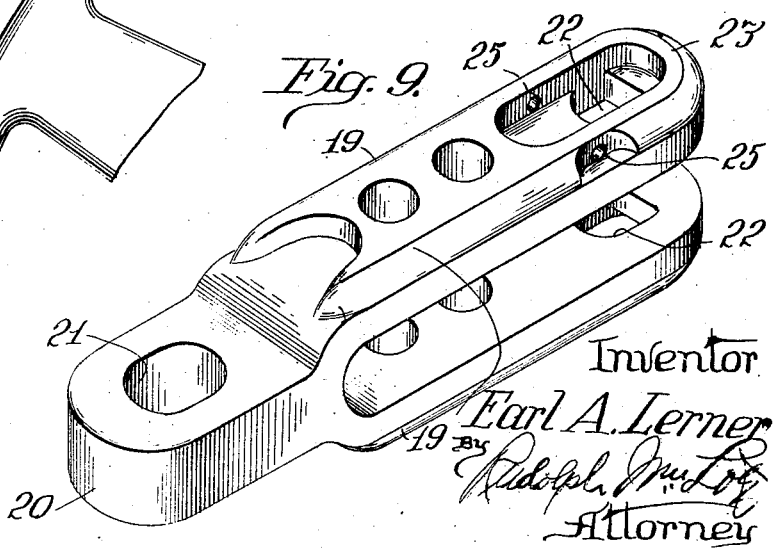

June 2, 1931.  E. A. LERNER  1,808,236
SPROCKET CHAIN
Filed June 16, 1928  3 Sheets-Sheet 3
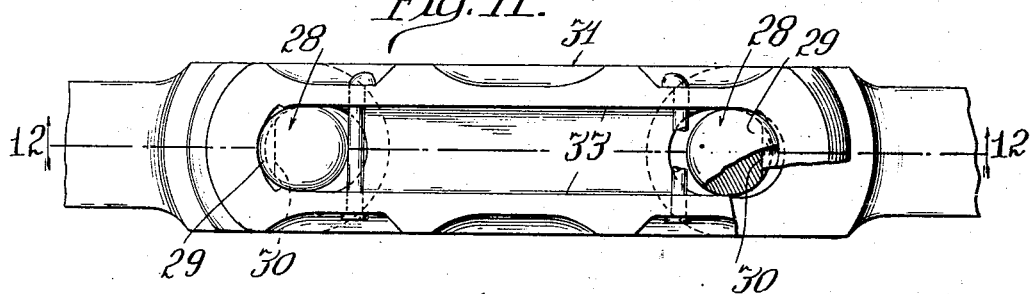
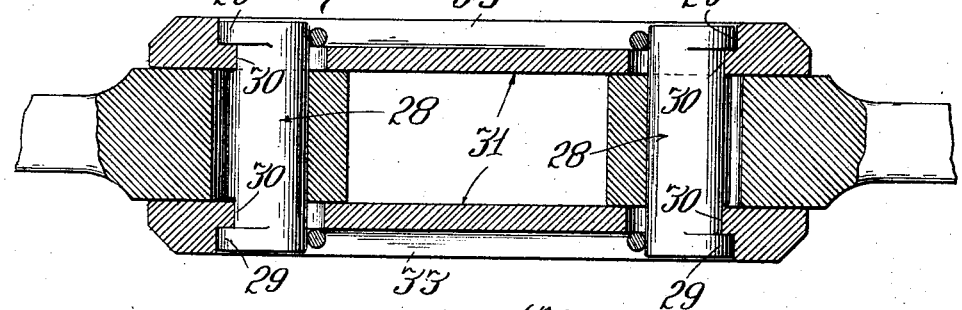
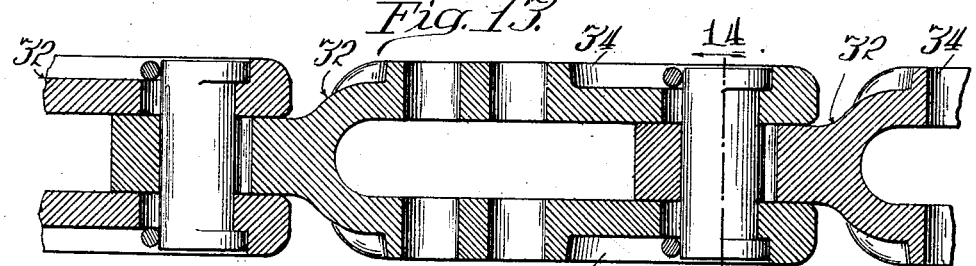
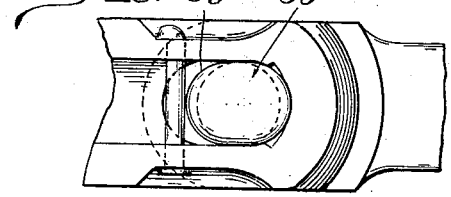
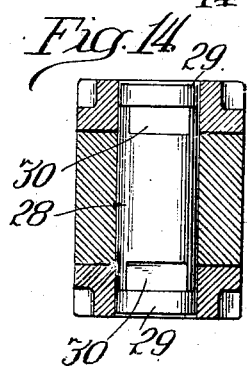
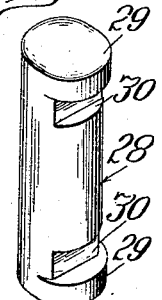
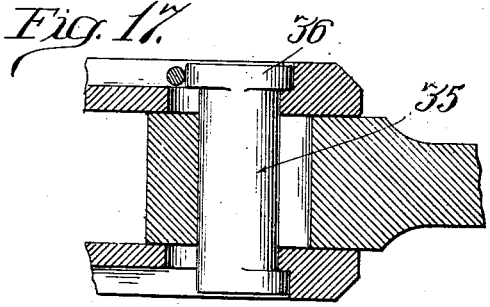
Inventor
Earl A. Lerner
By Rudolph ... 
Attorney Patented June 2, 1931

1,808,236

UNITED STATES PATENT OFFICE

EARL A. LERNER, OF CHICAGO, ILLINOIS, ASSIGNOR TO HIMSELF AND ERNEST E. CRANE, OF CHICAGO, ILLINOIS

SPROCKET CHAIN

Application filed June 16, 1928. Serial No. 286,000.

This invention relates to improvements in sprocket or conveyor chains or other articulate structures which should be capable of repair or replacement of parts without appreciable slack therein, the object of the invention being to provide a structure of this character which may be easily assembled and disassembled without sacrifice of strength or durability of any of the component elements while increasing the strength of some thereof.

The present invention is in the nature of an improvement upon the structure or type of structure described and claimed in United States Letters Patent to Frederick R. Harrison, No. 1,464,267, dated August 7, 1923, as will be more fully understood from the following specification.

In the accompanying drawings illustrating the invention, I have shown several types of articulate structures embodying the same, the invention being also applicable to other types of such structures than are particularly illustrated as will be easily apparent to those skilled in the art. In said drawings:

Fig. 1 is a fragmentary side elevation of a sprocket or similar chain constructed in accordance with the invention.

Fig. 2 is a sectional view of the same on the line 2—2 of Fig. 1.

Fig. 3 is a transverse section on the line 3—3 of Fig. 2.

Fig. 4 is a perspective view of one of the side links.

Fig. 5 is a perspective view of one of the pivot pins employed.

Fig. 6 is a fragmentary view of a sprocket wheel with a fragment of the chain trained over same.

Figs. 7 and 8 are views similar to Figs. 1 and 2 illustrating the invention as embodied in another type of link chain.

Fig. 9 is a perspective view of a link of the last-mentioned type.

Fig. 10 is a view similar to Fig. 6 showing the type of chain of Figs. 7 and 8 trained over a sprocket wheel.

Figs. 11 and 12 are views similar to Figs. 1 and 2 illustrating a slightly modified structure.

Fig. 13 is a sectional view similar to Fig. 8 showing the modification of Figs. 11 and 12 embodied in the type of chain of Figs. 7 and 8.

Fig. 14 is a transverse section on the line 14—14 of Fig. 13.

Fig. 15 is a perspective view of the modified form of pivot pin shown in Figs. 11 to 13 inclusive.

Figs. 16 and 17 illustrate a further structural modification.

The invention, as embodied in Figs. 1 to 6, inclusive, comprises pairs of side links 1, connecting bars 2, the end portions of which are engaged between the ends of the links 1, and pivot pins 3 associating the links 1 with the bars 2.

The association of the elements 1, 2 and 3 is such that by taking up a very little slack in the chain, any one of these elements may be removed and replaced with ease, it being an important object of the invention to so construct and relatively arrange these elements as to permit any one of the pins 3 to be removed and replaced from either side of the chain.

Each pin 3 comprises a cylindrical middle portion which engages in the substantially elliptical opening 4 in the bar 2, the latter rocking upon said portion of said pin. Each pin is provided at its ends with a substantially elliptical head 5 which is adapted to pass through the opening 4 in the bar 2. Between the heads 5 and the middle portion, the pin is provided with a flat shoulder 6 the width of which is substantially equal to the diameter of the middle portion and which is tangential to the circumferential surface of the latter. The elliptical heads 5 of the pin are so disposed as to each present a semi-cylindrical surface which is flush with the surface of the middle portion, said semi-cylindrical surface being diametrically opposed to the flat surface 6 so that the other semi-cylindrical end portion of the head 5 overhangs the said flat surface. The said heads 5 thus present short parallel side faces 7 interposed between their semi-cylindrical end portions.

The side links 1 consist of plates presenting opposed flat surfaces, the outer faces thereof being provided with what may be termed "peripheral" ribs 8 or said ribs may be defined as following the peripheries of said plates with which they are integral. The side edges of said links are parallel and their ends convex, the ribs being provided along the side edges of the links with recesses 9 midway between the ends of said links and with recesses 10 at opposite end portions thereof. The said ribs border a middle longitudinal groove 11 having parallel side faces which are also parallel with the side edges of the lengths, the end walls of the grooves 11 being of the same radius as the middle portions of the pins 3, there being also recesses 12 at the ends of the curved walls of said grooves 11. The width of the groove 11 is substantially equal to the diameter of the middle portion of the pins 3. The links are generally made of cast steel and the purpose of the recesses 12 is to permit more accurate casting and cleaning of the castings upon leaving the moulds.

The thickness of the body of each link is equal to the depth of the flat shoulders 6 of the pins 3, and the depth of the ribs 8 is equal to the thickness of the projecting or overhanging portions of the heads 5 of the pins 3.

In the bottoms and at opposite end portions of the links 1, I provide slots 13 each of which is of a width equal to that of the groove 11 and the side walls of which are flush with the side walls of said groove. The inner end of each slot 13 is semi-cylindrical and its outer or end wall is straight and extends perpendicularly to its side walls. This end wall of each slot 13 is spaced from the middle of the adjacent end wall of the groove 11 a distance equal to the overhang of the projecting portion of the head 5 of the pin and is engaged by the flat shoulder 6 of said pin 3 when the latter is in place. The length of each slot 13 is substantially equal to the long diameter of the head 5 of the pin so that said head may pass through the same and be then moved longitudinally thereof to cause the shoulder 6 to contact with the transverse end wall of the slot and the edge of the overhanging portion of said head to contact with the curved end wall of the groove 11. To retain the pin in this position relatively to the link 1, I provide perforations 14 in the ribs 8 and pass a retaining pin 15 therethrough, the position of said perforations being such that the pin substantially engages the adjacent end of the head. The ends of the retaining pin, consisting usually of an ordinary wire nail having a portion of its shank cut away with a dull cold chisel, lie within the recesses 10 of the ribs 8 and are thus protected against contact with objects passed by the links in travel.

From the foregoing it will be obvious that the pins 3 are held against rotation relatively to the links 1 by engagement of the shoulders 6 with the opposite transverse walls of the slots 13 and by engagement of the flat side faces of the heads 5 with the side walls of the grooves 11.

The bars 2 are pivotally engaged with said pins 3 and are also longitudinally movable relatively thereto but this relative longitudinal movement is of no consequence because in use, pressure on the bars 2 is exerted in only one direction which is always toward the adjacent ends of the links 1, this pressure being transmitted to the pins 3 to force them in the same direction relatively to said links thereby maintaining the shoulders 6 in close contact with the walls of the slots 13 opposed thereto. This will be readily understood by reference to Fig. 6 wherein the sprocket 16 may be considered as rotating either clockwise or anti-clockwise.

It will be apparent that the strains and stresses on the pins 3 are mainly of a shearing character and that, therefore, the weakest portion thereof is at the point or points of least cross-sectional area, which, in this instance, is confined to the middle portion. The latter is also necessarily subjected to the greatest wear and should, therefore, present an ample area of wearing surface as compared to those surface portions which are subject to little or no wear. Hence the middle portions of the pins are of a length more than double the aggregate lengths of the end portions which engage the links 1.

The said links 1 and bars 2 are subjected mainly to tension strains and stresses and, to the end that each pair of links shall be of somewhat greater aggregate strength in this respect than a single bar 2 because of lateral deflections often occurring in the operation of the chains under load which may throw the whole tension strains or stresses upon one only of a pair of said links, the ribs 8 are provided and serve not only to reinforce and strengthen the links but serve also to provide for surface contact between the links 1 and pins 3 extending over the entire aggregate depths of the heads 5 and shoulders 6.

Thus the structure above described presents not only one wherein the strains and stresses are nicely distributed in well balanced relation to each other but also one which is very easily assembled and disassembled. If, for example, the overhang of the head 5 relatively to the shoulder 6 is one-eighth inch, then by taking up only this much slack in the chain, a pin 3 may be extracted from either side of the chain links 1 or bars 2 removed, and replacements made.

In the type of structure shown in Figs. 1 to 6 inclusive, the sprocket wheel teeth are necessarily very widely spaced from each other. In many instances it is preferred to have the sprocket teeth less widely spaced thus necessitating the use of a different type of chain. I have, therefore, in Figs. 7 to 10 inclusive, shown one example of such type wherein the links are all alike.

Thus in the chain of Figs. 7 to 10 each link 18 consists of a modified form of Y-shaped bar having flat, parallel arms 19 at one end and a flat shank 20 at its other end, the latter being received between the arms 19 of the next adjacent link. In this structure each shank 20 is provided with an opening 21 exactly like those in the bar 2 and each arm 19 is provided with a slot 22 exactly like the slots 13 in the links 1, said slots being bordered by ribs 23 presenting side recesses 24 having perforations 25 disposed to receive retaining pins 26 similar to the pins of Figs. 1 and 2. The ribs 23 in this type of structure serve the same purpose and function as the ribs 8 of the links 1. This type of link is also usually provided with openings as shown to engage the bails or bail lugs of buckets which are carried by the chain. The pins 3 of this structure are identical with the pins 3 of Figs. 1 to 6 inclusive. The sprocket 27 used with this structure has its teeth less widely spaced than the sprocket of Fig. 6 but a disadvantage of the chain of Figs. 7 to 10 inclusive, resides in the fact that it can be driven in only one direction, that is, with the teeth of the sprocket 27 bearing upon the ends of the shanks 20.

In instances where the chains present very little slack it is desirable to so construct the pins and links as to adapt the same to this condition which applies equally to all types of such chains. I have, therefore, in Figs. 11 to 15 inclusive, illustrated a slight modification of the structures shown in Figs. 1 to 10 inclusive, which consists in moving the shoulder 6 of the pins 3 back and correspondingly shortening the overhanging portion of the head 5. Thus, as shown in Figs. 11 to 15, the pin 28 is provided just inwardly of each head 29 with a shallow transverse recess 30, the bottom or inner wall of which is flat and extends transversely of the long diameter of the head 29, the overhang of the latter being as much less than that of the head 5 of the pin 3 as equals the depth of the recess 30.

Thus, if the overhang of the head 5 of the pin 3 is one-eighth of an inch beyond the surface of the middle portion of the pin, then, if the recess 30 is one-sixteenth of an inch deep, the overhang of head 29 will be only one-sixteenth inch beyond the middle portion of the pin 28. These dimensions would apply approximately to a pin having a middle portion which is about three-quarters of an inch in diameter, it being obvious that in a pin of this diameter the shallow recess 30 would have an inappreciable weakening effect.

Obviously the dimensions of the openings and slots through which the heads of the pins 28 must pass, will correspond to the dimensions of said heads. The positions of the slots in the links 31 and 32, respectively, with respect to the ribs 33 and 34, will remain the same as in Figs. 1 to 10 inclusive, since the overhang of the head 29 with respect to the shoulder formed by the recess 30 remains the same. Said slots will, however, be shorter than in the structures of Figs. 1 to 10.

In Fig. 16 I have illustrated a modification which is equally applicable to the pins 3 and 28. This consists in providing one end of the pin 35 with a long parallel sided head 36 which overhangs diametrically opposed portions of the cylindrical middle portion, the side faces of said head engaging the opposed faces of the ribs 8 and 23 respectively. This modification involves no change in the size or shape of the slots in the links since the head 36 is not required to pass through the same.

This modified structure is advantageous only in better preventing rotation of the pin relatively to the links but lacks the advantage of being insertable and removable from either side of the chain.

Obviously, a pin structure corresponding in shape at one end with either the pin 3 or the pin 28 may be cast or otherwise formed integral with a link as is disclosed with respect to pins of another shape in the above-mentioned patent without departing from the present invention.

It will also be obvious that the rib formations bordering the openings in those portions of the links which are outermost in the assembled structure, will, independently of the opposed flat shoulder formations of the pins and the openings, serve to prevent rotation of the pins relatively to the ribbed elements because of the elliptical or other elongated contour of the heads. Hence, it will be obvious, without illustration, that the entire portions of the pins lying between the heads may be cylindrical. However, if the links consist of castings, as distinguished from forgings, a sufficient degree of accuracy of dimensions such as will, without subsequent machining, cause the side portions of the ribs to hug the side faces of the heads of the pins, is hardly attainable so that there may be such a degree of play or tolerance between the said heads and said ribs as will permit the latter to oscillate quite freely relatively to the ribbed portions of said links. This would cause undue wear upon the end portions of the pins because of the smaller area of surface subjected thereto and the opposed flat shoulder formations function, in such cases, to prevent this oscillatory movement and the wear incident thereto.

If the links are forged instead of being cast, a degree of accuracy of dimensions such as will obviate the necessity of providing the flat shoulders, is easily attainable so that said flat shoulder formations may be omitted if desired.

I claim as my invention:

1. An articulate structure of the type specified comprising a series of links disposed in overlapping relation to each other and presenting overlapped and overlapping end portions, each overlapped end portion being provided with a substantially elliptical opening semi-cylindrical at one end, each overlapping end portion having an opening of the same length and width as said elliptical opening and having a straight wall at one end, and pins for coupling said links, each of said pins comprising a cylindrical middle portion engaging in one of said elliptical openings, a head at at least one end corresponding substantially in shape and size with and adapted to pass through said elliptical openings and through the opening in the overlapping portion of a link, and a flat shoulder between said head and said middle portion overhung by said head and engaging the straight wall portion of the opening in the overlapping link portion, said respective openings being offset from each other and said overhanging portion of said head engaging the outer face of the overlapping link end, and a transverse retaining pin mounted in the latter and bridging the other end of the opening therein for retaining said head in the last-mentioned position.

2. An articulate structure of the type specified comprising a series of links disposed in overlapping relation to each other and presenting overlapped and overlapping end portions, each overlapped end portion being provided with a substantially elliptical opening semi-cylindrical at one end, each overlapping end portion having an opening of the same length and width as said elliptical opening and having a straight wall at one end, and pins for coupling said links, each of said pins comprising a cylindrical middle portion engaging in one of said elliptical openings, a head at at least one end corresponding substantially in shape and size with and adapted to pass through said elliptical openings and through the opening in the overlapping portion of a link, and a flat shoulder between said head and said middle portion overhung by said head and engaging the straight wall portion of the opening in the overlapping link portion, said respective openings being offset from each other and said overhanging portion of said head engaging the outer face of the overlapping link end, a transverse retaining pin mounted in the latter and bridging the other end of the opening therein for retaining said head in the last-mentioned position, ribs bordering each of the last-mentioned openings integral with the overlapping link ends and offset from the straight end walls of said openings and in engagement with the ends of the overlapping portions of the heads of said pins.

3. An articulate structure of the type specified comprising a series of links disposed in overlapping relation to each other and presenting overlapped and overlapping end portions, each overlapped end portion being provided with a substantially elliptical opening semi-cylindrical at one end, each overlapping end portion having an opening of the same length and width as said elliptical opening and adapted for axial alignment with the latter in assembling said structure and normally offset therefrom longitudinally of the assembled structure, and pins each comprising a cylindrical middle portion and a head at at least one end thereof corresponding substantially in shape and size with said elliptical opening for passage through the same and the opening in the overlapping link end when said openings are axially aligned, said head overlapping the outer face of the overlapping link end in the assembled structure at the end of said opening nearest the end of said last-named link, said last-named end equipped with an integral rib formation bordering the opening therein and engaging said head to prevent rotation of said pin relatively to said end, and stop-pins extending through perforations in said rib-formation and each spanning one end portion of an opening in engaging relation to the pin at points diametrically opposite said heads of the latter.

4. An articulate structure comprising a series of links and in which at least alternate links are overlapped at at least one end by two link ends on opposite sides thereof, each such overlapped link end provided with an elongated opening semi-cylindrical at the end nearest adjacent the link end, the overlapping link ends provided with openings corresponding in width and length with said first-named opening in assembling and offset relatively thereto after assembly of the structure, and cylindrical pins each having elongated heads at its ends of size and shape substantially the same as said first-named opening for passage through all of said openings when axially aligned, said heads overlapping the outer faces of the overlapping link ends at the ends of the openings therein nearest adjacent the terminals of said ends when said respective openings are relatively offset, and rib formations on said outer faces arranged to engage the overlapping end portions and side faces of said heads for preventing rotation of said pin relatively to the overlapping link ends, and stop-pins extending through perforations in said rib-formation and each spanning one end portion of an opening in engaging relation to the pin at points diametrically opposite said heads of the latter.

EARL A. LERNER.